United States Patent [19]

Sullo

[11] 4,134,516

[45] Jan. 16, 1979

[54] WEATHERPROOF OUTLET BOX COVER

[75] Inventor: Kenneth J. Sullo, Wellesley, Mass.

[73] Assignee: L. E. Mason Co., Boston, Mass.

[21] Appl. No.: 907,543

[22] Filed: May 19, 1978

[51] Int. Cl.² ............................................... H02G 3/14
[52] U.S. Cl. .................................... 220/242; 220/335; 174/67
[58] Field of Search ................. 220/242, 3.8, 335, 344; 174/67

[56] References Cited

U.S. PATENT DOCUMENTS

| 3,140,344 | 7/1964 | Slater et al. ....................... 220/335 X |
| 3,252,611 | 5/1966 | Weitzman et al. ................... 220/242 |

Primary Examiner—George T. Hall
Attorney, Agent, or Firm—Cesari and McKenna

[57] ABSTRACT

This invention relates to a weatherproof cover. It relates more particularly to a spring-loaded hinged cover of that particular type.

19 Claims, 10 Drawing Figures

WEATHERPROOF OUTLET BOX COVER

Weatherproof covers are used in conjunction with boxes or other housings to protectively enclose various electrical fixtures, among other things. Such covers are particularly useful to afford ready access to exterior electrical outlets and switches. Accordingly, for convenience, we will describe the present invention in that context.

The typical electrical outlet box is generally rectangular and closed on five sides. The box is recessed into or mounted exteriorly of a structure so that its open side is accessible. The box is typically sized to receive a standard duplex outlet and the outlet is secured to the box with its front face substantially flush with the open face of the box. A suitable opening in a wall of the box permits passage of electrical leads for connecting the outlet to a suitable source of electric power.

The cover of the general type with which we are concerned here includes a cover plate which is at least co-extensive with the open side of the box. Furthermore, the plate is provided with apertures which are shaped and located so as to expose the two parts of the duplex outlet which receive electrical plugs or switches. Actually, those outlet parts usually extend sufficiently far out of the box that they project into the apertures in the plate. The cover plate is secured in place either by a screw or other fastener extending through an opening in the plate and turned down into a threaded hole in the outlet.

The usual weatherproof outlet box cover also includes one or more spring-loaded aperture covers hinged to the cover plate to protect the electrical outlet mounted in the box from the weather when the outlet is not in use. In some cases, a single cover protects the entire duplex outlet, but more usually, each aperture in the cover plate has its own cover so that one section of a duplex outlet can be in use while the other outlet section is protected from the weather by an overlying cover which is biased to its closed position against the cover plate.

The prior spring-loaded weatherproof box covers of this general type are invariably relatively complex structures composed of many parts which are fairly difficult to make and assemble. Thus prior box covers invariably have separate hinge pin holes adjacent each aperture in the cover plate requiring separate drilling operations. Likewise, separate hinge pins are required to connect all the aperture covers to the cover plate. Conventional covers also use a separate spring to bias each aperture cover to its closed position against the cover plate and during assembly, these various parts must be arranged and secured at their proper locations. All of these drilling, forming, and connecting steps required to fabricate the prior box covers makes them relatively expensive hardware items.

SUMMARY OF THE INVENTION

Accordingly, the present invention aims to provide an improved weatherproof outlet box cover.

A further object of the invention is to provide a box cover of this kind which is composed of only a few parts.

Yet another object of the invention is to provide such a box cover substantially all of whose components can be diecast.

Still another object of the invention is to provide a weatherproof outlet box cover which requires no separate hinge pins or drilled holes therefor.

Still another object of the invention is to provide a weatherproof box cover having two separate spring-loaded hinged aperture covers yet which requires only a single spring.

A further object of the invention is to provide a box cover of this general type which is quite easy and inexpensive to assemble requiring, at most, a single press operation.

Other objects will in part be obvious and will in part appear hereinafter.

The invention accordingly comprises the features of construction, combination of elements and arrangement of parts which will be exemplified in the following detailed description, and the scope of the invention will be indicated in the claims.

Briefly, my weatherproof outlet box cover comprises a diecast metal cover plate that is of the appropriate size and shape to close the open side of the standard outlet box with which it is associated. The cover plate is provided with one or more apertures which accommodate the outwardly protruding portions of the electrical wiring device or devices for which the cover is designed, e.g., outlets. Also, the cover plate is formed with one or more collinear saddles projecting from the front face of the plate adjacent an edge thereof.

The weatherproof box cover also includes one or more aperture covers which are of the appropriate size and shape to completely cover the plate apertures as well as the electrical devices projecting from those apertures. Each aperture cover is formed as a single diecast metal part with one or more generally cylindrical pins or surfaces adjacent one edge of the aperture cover arranged to rotatively seat in the saddle or saddles formed in the cover plate so that the covers are situated side by side and each aperture cover can be swung between a closed position against the cover plate wherein it completely covers the corresponding plate aperture and the outlet portion therein and an open position wherein it exposes that aperture and outlet portion.

In accordance with this invention, spring means is provided to bias the aperture covers toward their respective closed positions. However, instead of the usual torsion spring or flat spring associated with each aperture cover, the present construction utilizes a single straight length of spring wire which not only functions to bias the cover or covers, but also helps to maintain the hinge connection between those covers and the cover plate.

The opposite ends of the wire are retained in pockets formed at the opposite ends of the aperture cover or if there are two such covers, at the remote ends thereof. With the covers in their closed positions, these pockets are positioned somewhat inboard of the hinge line of the cover or covers. The center of the wire, on the other hand, is captured at a location on the cover plate inboard and below the hingeline of the aperture cover or covers. The wire is equivalent to a simple beam which is capable of deflecting in any direction with uniform stress. In this instance, the wire is deflected by applying a load at its center so that the wire contains appreciable potential energy. The tendency of the wire to reassume its normal unstressed linear condition causes the opposite ends of the wire to exert a torque on the aperture cover or covers so as to bias them against the cover plate.

If an aperture cover is swung toward its open position, an end of the spring wire is swung in a small circle about the cover hinge line resulting in additional deflection of the wire from its normal unstressed linear condition. Accordingly, when the aperture cover is released, it immediately snaps to its closed position against the cover plate.

Since the center of the spring wire is secured at a location below the hinge line of the aperture covers, the wire also suffices to bias the hinge pins adjacent the ends of the wire into their respective saddles. Consequently, those hinge pins remain firmly rotatively seated obviating the need to provide the usual drilled hinge pin holes or gudgeons to completely encircle the hinge pins. This construction yields distinct advantages in terms of the ease of assembling the present weatherproof box cover as will be described in detail later.

Thus my weatherproof box cover comprises only a few parts. In the case of a box cover with a single aperture cover, only three parts are required, namely a diecast cover plate, a diecast aperture cover and a single length of spring wire. A box cover with two aperture covers still uses only a single spring wire. Thus the cost of manufacturing the present weatherproof box cover is relatively low as compared with prior covers requiring hinge pins, drilled hinge pin holes, separate springs, etc. Moreover, my weatherproof box cover is extremely simple to assemble. No special equipment is needed to assemble a box cover having a single aperture cover and at most only a single press operation is needed to assemble a box cover having two aperture covers. Consequently, the cover should prove to be a very useful hardware item and find wide application in the electrical parts and construction industries.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
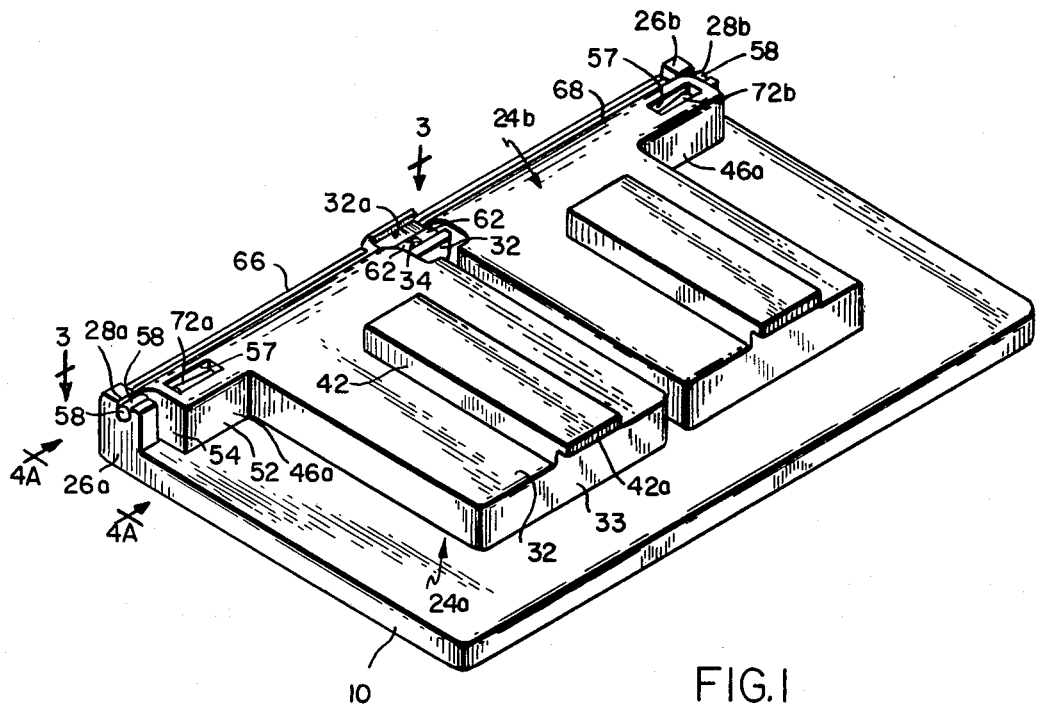
FIG. 1 is a perspective view of a weatherproof electrical duplex outlet box cover embodying the principles of my invention with its aperture covers shown in their closed positions.
Figure 2:
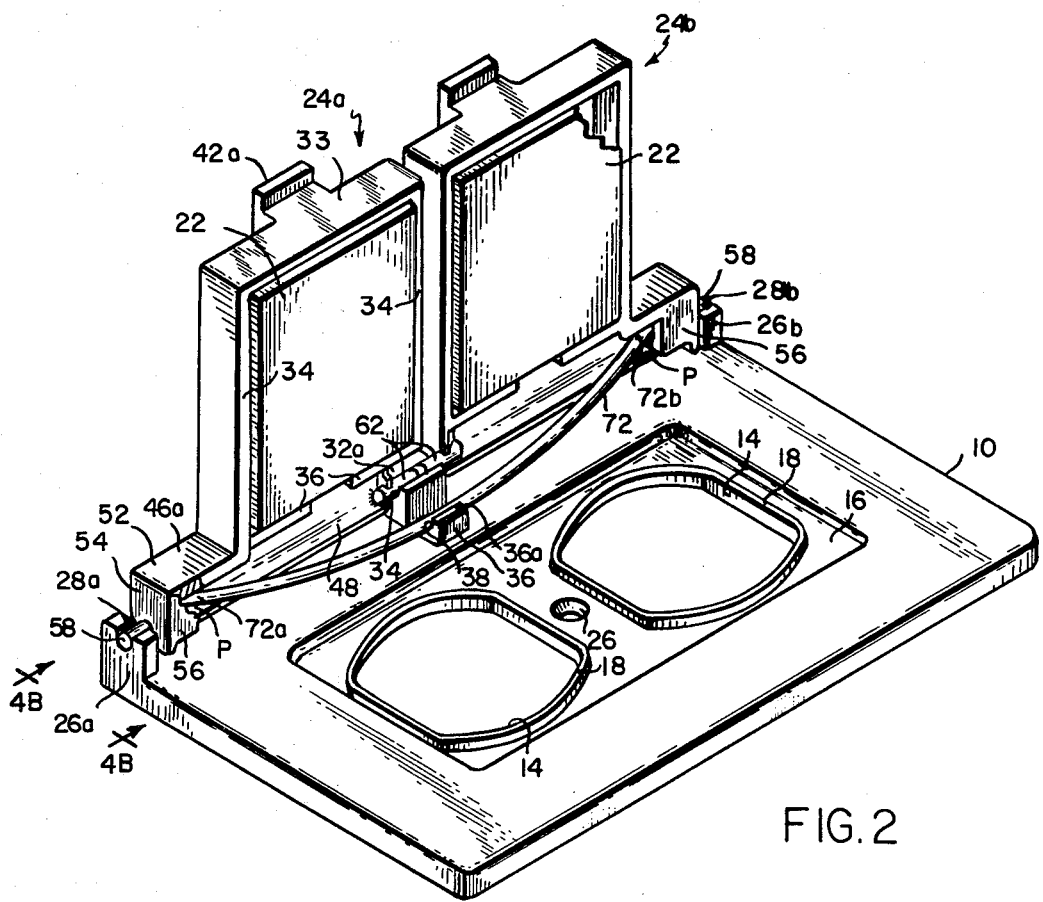
FIG. 2 is a view similar to FIG. 1 but depicting the aperture covers in their open positions.

Turning now to FIGS. 1 and 2 of the drawings, the weatherproof box cover of this invention comprises a generally rectangular diecast metal cover plate 10 which is arranged to engage over the open side of a standard outlet box (not shown) such as the one depicted in U.S. Pat. No. 3,252,611. The illustrated cover is arranged to protectively enclose a duplex electrical outlet. Accordingly, plate 10 is provided with a pair of apertures 14 to accommodate the two outwardly projecting portions of the conventional duplex outlet. The apertures 14 are formed in a depressed central area 16 of plate 10 and are provided with rims 18 which cooperate with gaskets 22 recessed into a pair of diecast mirror image aperture covers 24a and 24b hinged to plate 10. Cover plate 10 is suitably secured in place in a conventional fashion by means of a screw (not shown) that extends through a hole 26 at the center of plate 10 and is turned down into the duplex outlet contained in the outlet box enclosed by the present cover.

Figure 3:
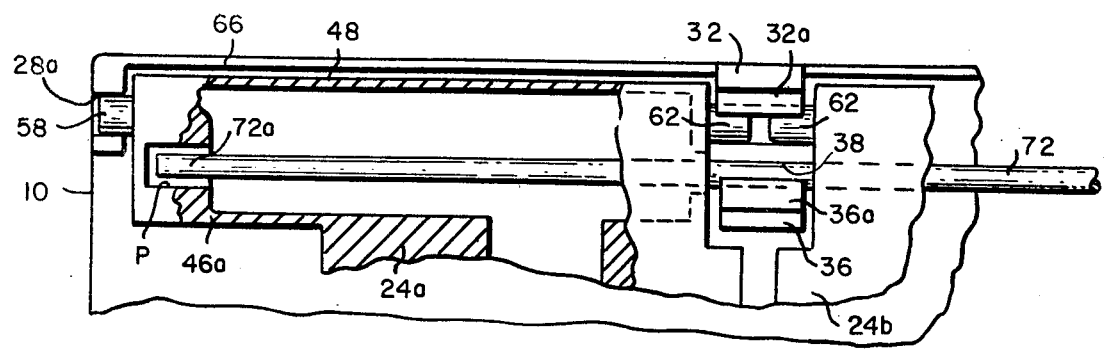
FIG. 3 is a plan view along line 3—3 of FIG. 1 with parts cut away.

Referring now to FIGS. 1 to 3, the cover plate 10 at the time it is formed with a pair of bosses 26a and 26b projecting from the outer face of the plate at the opposite ends of a long edge of the plate. The tops of the bosses 26a and 26b are formed with collinear, generally semicylindrical grooves 28a and 28b whose axes lie parallel to the adjacent edge of plate 10. Located midway between bosses 26a and 26b is a third upwardly projecting boss 32 also formed with a generally semicylindrical groove 34 collinear with grooves 28a and 28b. The grooved bosses 26a, 26b and 32 constitute saddles for hingedly supporting the aperture covers 24a and 24b.

Formed integrally with plate 10 and boss 32 is another upwardly projecting boss 36 spaced between boss 32 and the plate depression 16. The two bosses 32 and 36 define between them a generally semicylindrical groove 38 whose function will be apparent presently. Suffice it to say at this point that groove 38 is situated below and inboard of the line defined by the saddle grooves 28a, 28b and 34 as best seen in FIGS. 2 and 3.

The aperture covers 24a and 24b are mirror images of one another. Therefore, for brevity we will only discuss cover 24a in detail. Cover 24a is generally rectangular in shape and comprises a flat top wall 32 and a depending front wall 33 and depending side walls and end walls 34 and 36 respectively. The top wall 32 is formed with a raised generally rectangular boss 42 having a lip 42a projecting beyond the cover front wall 33 which functions as a handle to facilitate opening the aperture cover.

In addition, aperture cover 24a has a rearward extension 46 bounded by the wall 36 and a parallel wall 48 spaced rearwardly of wall 36. Also extension 46 has a integral leg 46a that projects from one side of the aperture cover. Thus, in FIG. 1 the aperture cover 24a includes a leg 46a that projects at right angles relative to the lefthand or lower cover wall 34. Leg 46a has a depending front wall 52, a depending end wall 54 and a depending rear wall which is an extension of wall 48. Also as best seen in FIG. 2, leg 46a has an integral bottom wall 56 adjacent end wall 54 that forms a pocket P at the end of extension leg 46a whose function will become apparent. Small openings 57 in the top wall of leg 46a facilitate casting the shelf 56 to form pocket P.

The total length of the extension 46 is slightly less than the distance between bosses 26a and 32 and a pair of integral collinear pins 58 and 62 project out from the opposite ends of extension 46. These pins are shaped and arranged to pivotally seat in the grooves 28a and 34 in the plate bosses 26a and 32 respectively.

The aperture cover 24b is more or less the same as cover 24a except that the positions of its leg extension 46a and its pin 58, on the one hand, and its pin 62 on the other are reversed from those of their counterparts in cover 24a. Thus as viewed in FIG. 1, the extension leg 46a projects toward the upper end of the cover so that its pin 58 seats in groove 28b while its pin 62 pivotally seats in groove 34 alongside the corresponding pin of cover 24a. The two pins 62 are rotatively secured in groove 34 by upsetting the top of boss 32 over the pins 62 as shown at 32a in FIG. 5. With this arrangement, then the two aperture covers 24a and 24b are situated side by side and can be swung individually from a closed position illustrated in FIG. 1 wherein the cover lies flush against its plate aperture 14 to an open position illustrated in FIG. 2 wherein the cover is oriented more or less perpendicular to plate 10 thus completely exposing the corresponding aperture 14.

In order to positively define the open positions of the aperture covers, as shown in FIGS. 1 and 3, plate 10 is formed with a raised wall 66 extending along its edge adjacent bosses 26a and 26b. Also the rear edges of the cover extensions 46 are rounded or beveled as shown at 68 so that sufficient clearance is provided between wall 66 and the aperture cover extensions to permit the covers to be swung to their open positions, whereupon the top wall of the extensions 46 engage the edge of plate wall 66 preventing the covers from opening further.

Referring now to FIGS. 1 to 3, both aperture covers 24a and 24b are biased toward their closed positions illustrated in FIG. 1 by a single length of normally straight spring wire 72. The length of wire 72 is slightly less than the total distance between the extension end walls 54 of the two aperture covers. Prior to seating the pivot pins of the aperture covers in their respective saddles, the opposite ends of the spring wire 72 are positioned so that they project into the pockets P formed in the extension legs 46a of the two covers. It should be understood that the term pocket is intended to mean any boss, opening, finger or the like that is capable of relatively loosely receiving and retaining an end of the spring wire.

Then the center of the spring wire 72 is captured in the groove 38 formed in boss 36. While this may be done in a variety of ways, a particularly desirable method of accomplishing this is by staking, coining or swedging over the top edge of the boss as shown at 36a in FIGS. 2 and 3. For convenience, this can be done when boss 32 is upset as described above to capture the hinge pins 62.

Figure 4A:
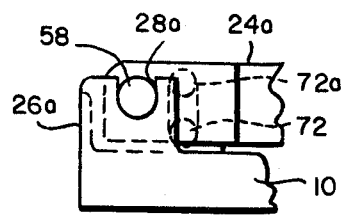
FIG. 4A is a view along line 4A—4A of FIG. 1.

As best seen in FIGS. 1 and 3, the pockets P and the groove 34 are positioned inboard of the common axis or hinge line of the cover pins 58 and 62 when the covers are in their closed positions shown in FIGS. 1 and 3. However, as best seen in FIGS. 2 and 4A, the groove 38 in which the center of the spring wire 72 is capture is located below the common axis of the pivot pins 58 and 62 as well as below the line defined by the pockets P. Therefore, when the aperture covers are in their closed positions, the wire functions as a beam supported at each end within the pockets P with a concentrated load at its center where it is captured in the groove 38. As such the spring wire tends to resume its normal unstressed linear state with the result that its ends 72a and 72b exert torques on the cover extension legs 46a that tend to swing the covers 24a and 24b to their closed positions against cover plate 10 shown in FIG. 2.

Figure 5:
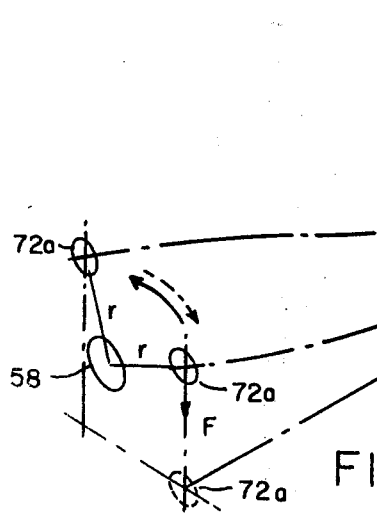
FIG. 5 is a diagrammatic view illustrating the operation of the subject box cover.

The forces exerted by spring wire 72 are indicated diagrammatically in FIG. 5. That figure shows the forces acting on cover 24a only. However, the same principles apply to its effects on cover 24b. With the center of the spring 72 pinned at point 38, the spring wire end 72a tends to assume the straight-line position illustrated in dotted lines in FIG. 5. However, due to the positional relationships between the pockets P and the groove 38 described above, the wire end 72a actually assumes the position shown in solid lines in FIG. 5 wherein the wire end is displaced vertically above groove 38 when the associated aperture cover 24a is in its closed position. Due to the flexible resilient nature of the spring wire, its end 72a exerts a force F in the indicated direction toward its undeflected position shown in dotted lines. This force F acts on a radius arm r equal to the distance between the cover pivot pin 58 and the wire end 72a. Thus the spring wire exerts a torque of rF in a clockwise direction that tends to maintain the aperture cover 24a at its closed position shown in FIG. 1. It should be noted at this point that while the spring wire 72 exerts a torque on the aperture cover 24a, the spring itself is not a torsion member since the wire end 72a is completely free to swivel or turn within its pocket P. Indeed the entire wire may be free to turn on its axis. Rather, the wire functions as a simple cantilevered beam which is capable of deflecting in any direction with uniform stress unlike prior torsion elements used for this purpose which often suffer fatigue distress as the aperture covers are swung repeatedly between their two positions.

Still referring to FIG. 5, when cover 24a is swung toward its open position, the wire end 72a moves in a circle of radius r in a direction indicated by the solid arrow A toward its uppermost position shown in that figure. Accordingly the spring wire is deflected even more so that its end 72a lies an appreciable distance away from its unstressed dotted line position. The wire end 72a now exerts a restoring force in the direction toward its dotted line position, which force can be separated into two components, one lying along the radius arm r and one extending perpendicular to the radius arm r. The latter force component exerts a torque on the cover extension leg 46a which tends to swing the aperture cover 24a in the direction of the dotted line arrow towards its closed position illustrated in FIG. 1.

It should be mentioned at this point that the radius arm r, i.e., the distance between pockets P and the aperture cover pivot axis should be kept small to avoid overstressing the wire 72 when the covers 24a and 24b are opened fully.

Figure 4B:
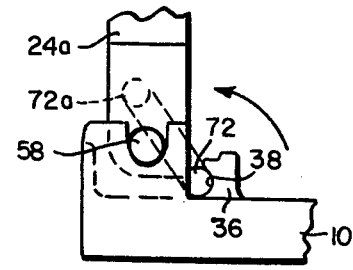
FIG. 4B is a similar view along line 4B—4B of FIG. 2.

The fact that the subject weatherproof box cover utilizes a spring wire 72 as a simple cantilevered beam rather than a torsion element gives it an additional advantage over prior covers of this type. More particularly as shown in FIGS. 4A and 4B, at all positions of the covers 24a and 24b, the opposite ends of the spring wire 72 exert forces on the cover extension legs 46a in a direction toward the cover plate. Thus, the spring wire itself rotatively retains the cover pivot pins 58 in their respective grooves 28a and 28b. This enables the female hinge components of the box cover to be a simple saddle or saddles which can be cast integrally with the cover plate 10 rather than a hinge pin hole which must be drilled in a separate operation after the cover plate is cast. This feature alone greatly simplifies the manufacture of the subject cover. It also simplifies considerably the assembly of the present cover.

Figure 6:
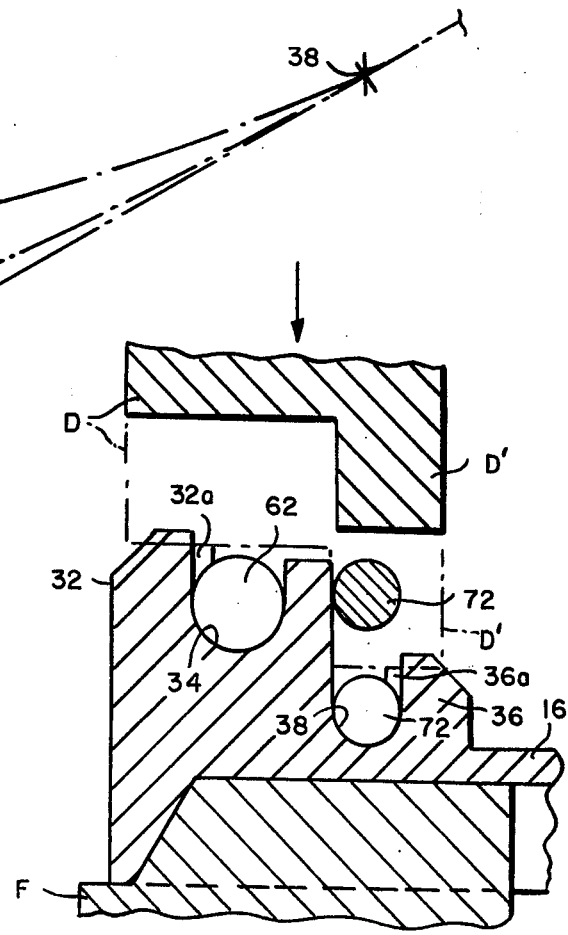
FIG. 6 is a fragmentary sectional view showing the mode of assembling the FIG. 1 cover.

More particularly and referring to FIGS. 1 and 6, to assemble the present weatherproof box cover, the cover plate 10a is placed on a fixture F shown in FIG. 6. Then the opposite ends of the spring wire 72a and 72b are inserted into the pockets P in the two aperture covers and the covers are simply laid down on the plate with their pivot pins in the grooves 28a, 28b and 34 as seen in FIG. 1. At this point the center of the unstressed spring wire 72 is situated at the shaded location shown in FIG. 6 so that it is substantially straight. Now, a die D mounted on the end of a vertical press (not shown) directly above fixture F is urged downward in the direction shown by the arrow in FIG. 6. Die D has a depending extension D' which overlies the center of the spring wire 72.

As the die moves downward, the extension D' presses the center of the spring wire toward its solid line position in FIG. 6 in which the wire is seated in groove 38. Further downward travel of the die toward its bottomed position shown in dotted lines in FIG. 6 causes the die extension D' to upset the top of the boss 36 into groove 38 above wire 72 as shown at 36a so that the upset material 36a captures the center of the spring wire 72 in groove 38. At the same time, the main part of the die D engages and upsets the top of boss 32 so that a body of material 32a therefrom is forced into groove 34 above both pivot pins 62. In this fashion, the pivot pins are captured in the groove 34. Yet, being cylindrical in shape, they are able to pivot therein as the aperture covers are swung between their open and closed positions.

Thus with a single, simple press operation, the inner hinge pins of the aperture covers and the center of the spring wire are secured at their appointed locations. On the other hand, the cover outer hinge pins 58 do not even have to be captured because as described above they are firmly held in place in their respective saddles by the spring wire itself.

Figure 7:
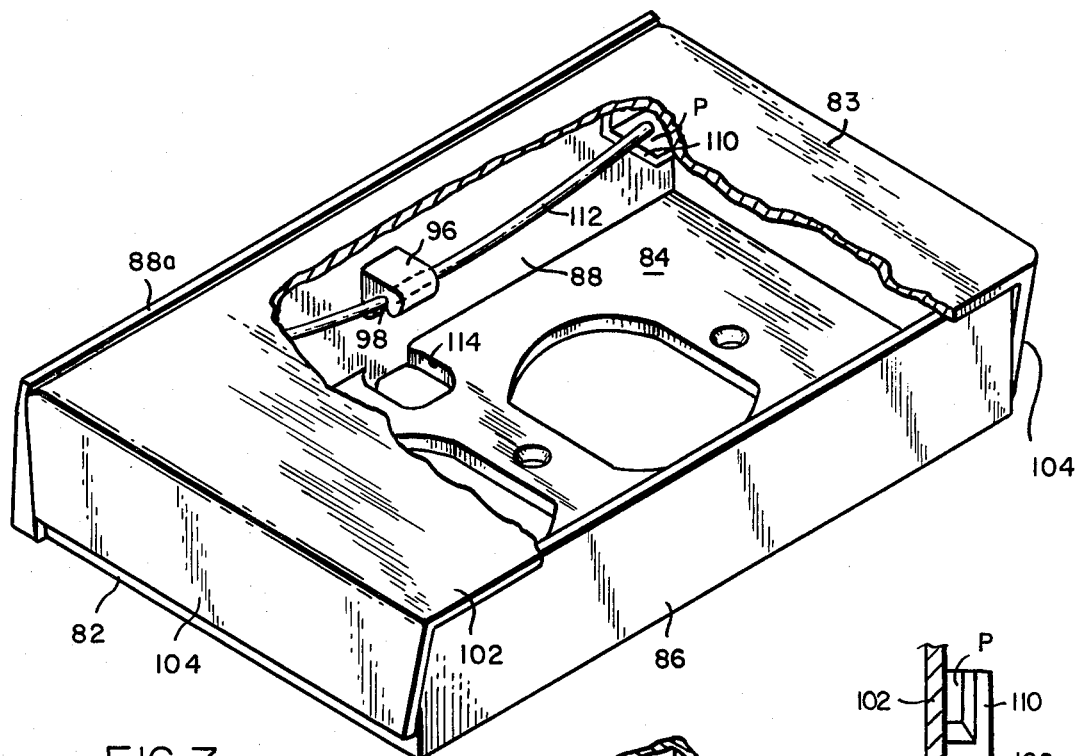
FIG. 7 is a perspective view with parts cut away of a modified box cover embodiment showing the aperture cover in its closed position.
Figure 9:
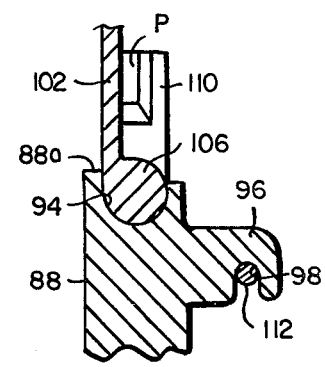
FIG. 9 is a sectional view along line 9—9 of FIG. 7.
Figure 8:
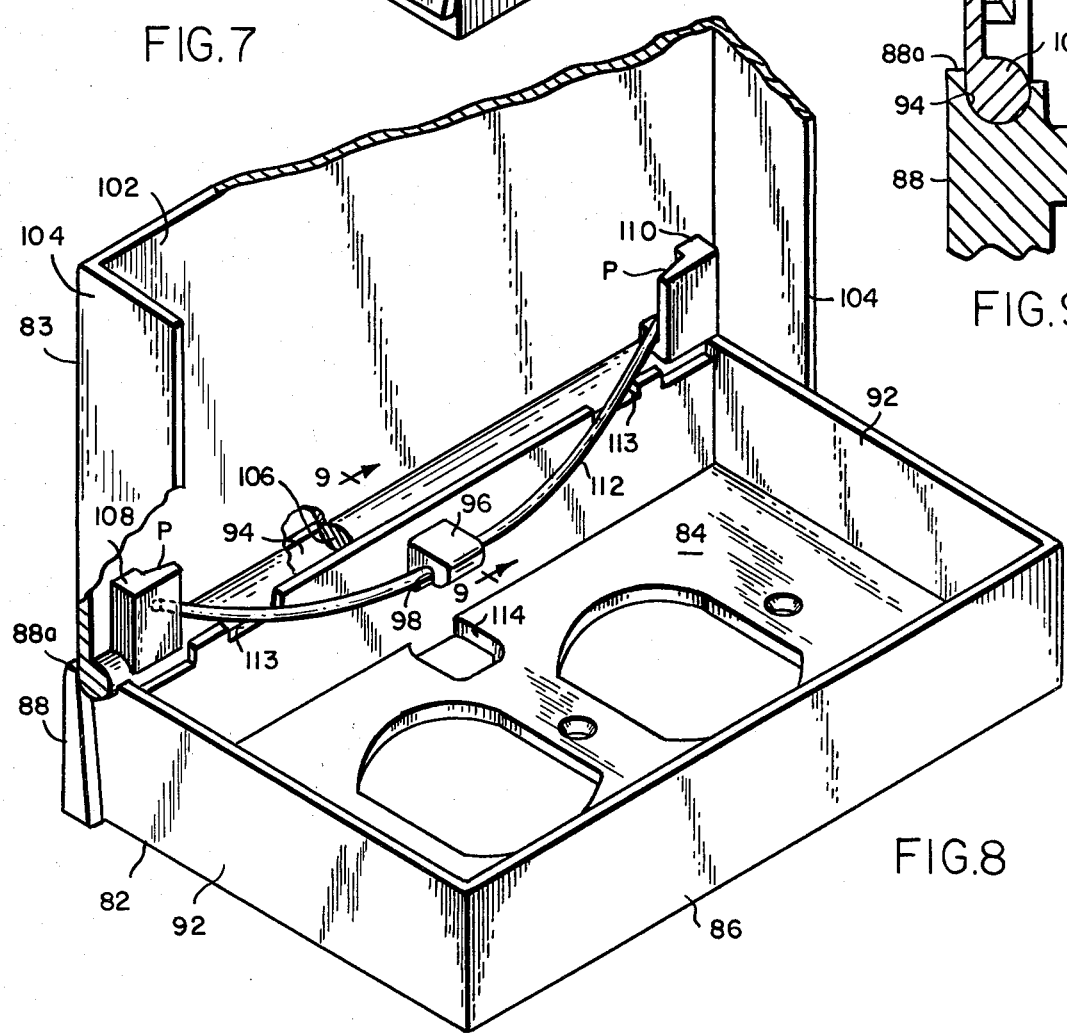
FIG. 8 is a view similar to FIG. 7 but with the aperture cover in its open position.
Figure 1:
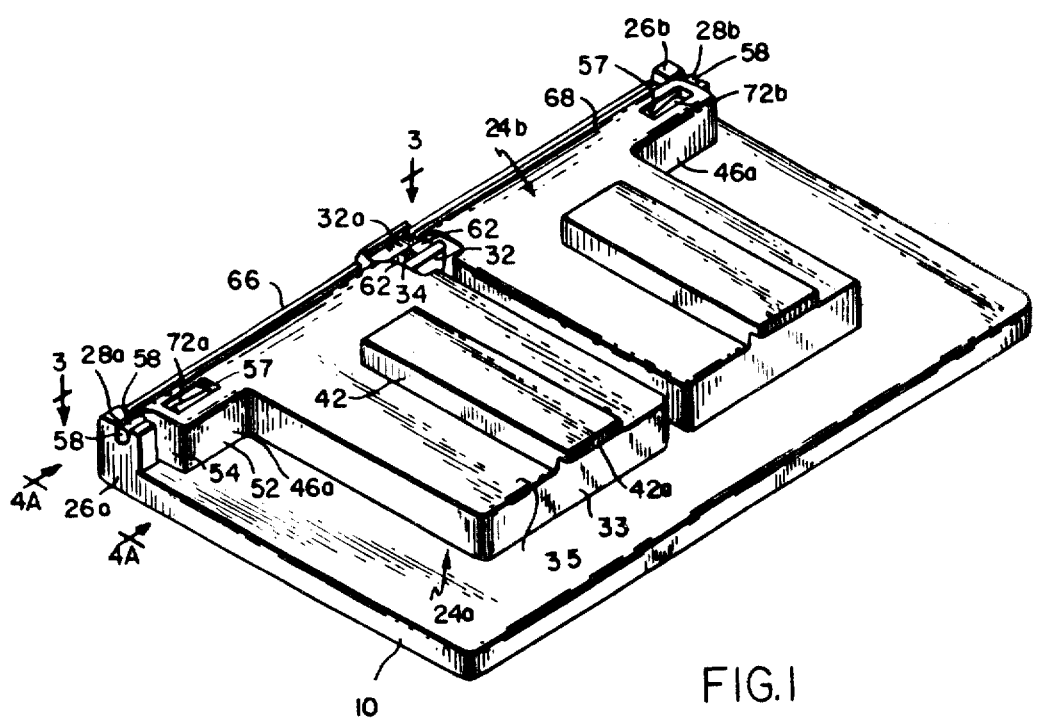

FIGS. 7 and 8 illustrate another box cover embodiment also designed for a duplex outlet, but employing only a single aperture cover. In this embodiment, the box cover plate 82 is itself a box-like structure having an apertured bottom wall 84, a front wall 86, a rear wall 88 and a pair of side walls 92. An aperture cover 83 is hingedly connected to the rear wall 88 of the plate 82 so that when it is in its closed position illustrated in FIG. 7, it completely covers the apertured bottom wall 84 and when it is moved to its open position shown in FIG. 8, ready access may be had to an outlet projecting through bottom wall 84. Plate 82 is also arranged to be secured over the open side of a standard weatherproof outlet box, the usual screw holes being provided in bottom wall 84 for that purpose.

As seen in FIG. 8, the rear wall 88 is relatively thick and it is formed with a relatively deep semicylindrical groove 94 which extends the entire length of wall 88. Also that same wall is formed midway along its length with an inwardly projecting boss 96. The boss has an upwardly extending notch 98 in its underside whose location is below and inboard of groove 94 in wall 88.

The cover 83 has a generally rectangular top wall 102 that is slightly larger than the open side of cover plate 82. Also the cover includes a pair of side walls 104 that extend down just outside of plate side walls 92 when the cover is in its closed position shown in FIG. 7. The left hand or rear edge of top wall 102 is formed with an integral cylindrical bead 106 which extends the entire length of wall 102. Bead 106 is dimensioned so that it rotatively seats in groove 94, which functions as a saddle. Thus the bead and groove form a hinge permitting the cover 83 to be swung between the closed position shown in FIG. 7 and an open position illustrated in FIG. 8.

Also cast integrally with the cover 83 are a pair of bosses 108 and 110 located on the underside of top wall 102 near the opposite ends thereof adjacent bead 106. These bosses form pockets P whose function is exactly the same as the pockets P in the FIGS. 1 and 2 cover embodiment. That is, they retain the opposite ends of a spring wire 112 whose center is captured in the groove 98 in boss 96. The spring wire 112 also functions in exactly the same way as wire 72 described above in that it constitutes a cantilevered beam which biases the bosses 108 and 110 and hence the cover 83 as a whole toward its closed position shown in FIG. 7. The cover 83 can be swung from that position to an open position illustrated in FIG. 8. When the cover is oriented more or less perpendicularly to plate 82, the top edge 88a of the plate wall 88 engages the top of the cover wall 102 preventing the cover from opening further. If necessary, notches 113 can be formed in wall 88 on the inboard side of the groove 98 to provide clearances for the spring wire 112 as the cover is swung to its fully open position.

The FIGS. 7 and 8 embodiment of my invention has all of the advantages discussed above in connection with the FIGS. 1 and 2 cover. Since it has only a single aperture cover, it consists of only three parts, two of which are diecast and the third of which is a simple straight length of spring wire. The box cover is assembled simply by placing the opposite ends of the spring wire 112 in pockets P and laying the aperture cover 83 on the open side of plate 82 more or less as shown in FIG. 7. Finally, the center of the spring wire 112 is hooked under boss 96 in groove 98.

To facilitate that, a small opening 114 is formed in bottom wall 84 just below boss 96. A small hook similar to a crochet hook can be inserted through that opening and engaged over wire 112. Then the hook can be retracted through the opening 114 to draw the center of the spring wire under the boss so that it seats in notch 98. Alternatively, a pair of conventional needlenose pliers can be inserted through the opening to capture the spring wire. Thus to assemble the FIGS. 7 and 8 box cover, no special tools or equipment at all are required.

This cover embodiment, like the one described above, requires no separate hinge pin holes or separate hinge pins to connect the aperture cover 83 to the cover plate 82. Rather, the cover 83 simply seats in the groove 94 and is hingedly retained there by spring 112 whose ends bias the cover hinge bead 106 into its groove or saddle 94. As described previously, this feature not only greatly reduces parts cost, but also simplifies assembly of the present weatherproof cover.

It should be understood also that the center of the spring wire 112 can be captured in the same manner described above in connection with FIG. 1 and conversely the spring wire 72 shown in FIG. 1 can be captured in a upwardly extending notch such as the one shown at 98 in FIG. 8. In both cases, all that is required is that the spring wire be retained in a position that preloads the spring wire as shown in FIG. 5 so that its ends exert forces on the covers that retain their end hinge pins in their respective saddles and also apply a torque to the aperture cover or covers which tends to bias those covers to their closed positions.

It should be mentioned at this point that in some applications an aperture cover may be quite short and thus have a short hinge line. This would necessitate using a short length of spring wire. To avoid over-bending and potentially overstressing the wire when the cover is opened fully, the wire retaining pocket or pockets P and notch 98 can be made relatively wide to permit the wire ends and the captured wire middle segment to shift rearwardly or toward the hinge axis to some extent as the cover is opened. This reduces the relative displacement between the wire ends and its middle segment, while still providing the requisite spring bias to close the cover.

It will be seen from the foregoing then that my improved weatherproof outlet box cover greatly simplifies the construction of such covers in that utilization of simple diecast parts and a single wire eliminates the need for separate hinge pins and hinge pin holes and the requirement of a separate spring for each aperture cover. Furthermore, the present construction lends itself to easy assembly of the cover parts without requiring any special tools or equipment other than, at most, a single vertical press although even that can be dispensed with if the cover spring wire is captured as shown in FIGS. 7 and 8.

It should also be understood that various changes can be made in the above constructions without departing from the scope of the invention. For example, the hinge saddles or grooves can be formed on the aperture covers, and the cylindrical hinge pins or surfaces can be formed on the cover plate. So too, the locations of the pockets P and the captured center point of the spring wire can be reversed. For example in FIG. 8, the pockets P can be formed in the plate rear wall 88 and the boss 96 can be formed on the underside of cover 83 so that the center of the wire moves in an arc when the cover 83 is opened. Also in some applications, it may be desirable to have the aperture cover biased toward an open position so that when a latch holding the cover closed is released, the cover snaps to its open position. Using the principles disclosed herein, this is easily accomplished by positioning the spring wire on the opposite side of the aperture cover hinge. Thus for example in FIG. 8, the boss 96 can be formed on the outside of the rear wall 88 and the pockets P formed in the upper side of the cover wall 102. With the spring wire 112 engaged in the pockets and under the boss 96, it would tend to bias the cover 83 towards its FIG. 8 open position.

Also it should be appreciated that the present cover can be mated with boxes used for a variety of purposes other than to house electrical outlets and switches. For example, the cover could be used to close the glove compartment or conceal the gasoline fill pipe of an automobile or indeed in any application requiring a spring loaded cover or door.

It will thus be seen that the objects set forth above, among those made apparent from the preceding description are efficiently attained, and since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

I claim:

1. A weatherproof outlet box cover comprising
    A. a cover plate
    B. means defining one or more apertures in the cover plate
    C. closure means
    D. means for hingedly mounting the closure means to the cover plate, said mounting means having a pivot axis and including
        (1) one or more saddles formed on one of said cover plate and said closure means, said saddles all being collinear, and
        (2) one or more curved surfaces formed on the other of said cover plate and said closure means, said curved surfaces being collinear and arranged and adapted to seat in said saddles so that said closure means can be swung between a closed position wherein it lies against the cover plate and covers an aperture therein to an open position wherein it is oriented at an angle relative to the cover plate and exposes an aperture therein.
    E. a flexible resilient spring wire
    F. means on the closure means for receiving the opposite ends of the spring wire at locations spaced from the pivot axis of the mounting means, and
    G. means on the cover plate for capturing a central portion of the spring wire so that said portion is deflected away from the pivot axis toward the cover plate whereupon the ends of the spring wire exert a torque on the closure means so as to bias the closure means toward its closed position.

2. The box cover defined in claim 1 wherein the closure means comprises a single aperture cover which is more or less coextensive with the cover plate and the spring end receiving means are positioned near the opposite ends of the aperture cover.

3. The box cover defined in claim 1 wherein the closure means comprises a pair of aperture covers independently swingable between their respective open and closed positions and the spring end receiving means are located adjacent the remote ends of the two aperture covers.

4. A cover assembly comprising
    A. support means;
    B. closure means;
    C. means for hingedly connecting an edge of the closure means to the support means so that the closure means can be swung between a closed position against the support means to an open position away from the support means;
    D. a length of spring wire;
    E. means formed in the side of the closure means facing the support means for receiving the opposite ends of the spring wire, said receiving means being spaced from the pivot axis of the connecting means, and
    F. means formed in the support means for capturing a segment of the spring wire intermediate its ends so that when the closure means is in its closed position, said spring wire segment is deflected toward the support means whereby the ends of the spring wire exert a torque on the closure means that tends to bias the closure means to its closed position.

5. The cover assembly defined in claim 4 wherein
    A. said connecting means comprises
        (1) one or more saddles formed in one of said closure means and said support means, and (2) means defining curved bearing surfaces on the other of said closure means and said support means, and B. the deflection of said spring wire also causes the ends of said spring wire to rotatively retain said bearing surface defining means in said saddles.

6. The cover assembly defined in claim 4 wherein said closure means comprises a single cover member and the spring wire receiving means are located at opposite ends of the cover member adjacent said connecting means.

7. The cover assembly defined in claim 4 wherein said closure means comprises a pair of cover members hingedly connected side by side to said support means and swingable between respective open and closed positions and said spring wire receiving means are located at the remote ends of said cover members adjacent said hinged connections to the support means so that one end of the spring wire biases one cover member toward its closed position while the other end of the spring wire biases the other cover member toward its closed position.

8. The cover assembly defined in claim 4 wherein the support means comprises a plate having aperture therein for receiving the protruding portions of electrical devices.

9. The cover assembly defined in claim 5 wherein said support means and saddle constitute a first diecast part and said closure means and said bearing surface defining means constitute a second diecast part.

10. An outlet box cover comprising
A. cover plate,
B. means defining one or more apertures in the cover plate,
C. one or more aperture covers,
D. means for hingedly connecting each aperture cover to the cover plate so that each aperture cover is swingable between a closed position wherein it overlies an aperture in the plate and an open position wherein it exposes an aperture in the plate, said connecting means including collinear saddles and beads on said cover plate and said aperture covers, said beads being rotatively seated in said saddles to permit each aperture cover to swing between its said two positions, and
E. means for biasing each aperture cover toward one of its said positions, said biasing means including
(1) a length of flexible resilient spring wire, and
(2) means on each said aperture cover and said cover plate for capturing the spring wire so as to deflect said wire whereby it functions as a cantilevered beam that exerts a torque on said aperture cover cover about its said connecting means to the cover plate that urges said aperture cover toward its said one position.

11. The cover defined in claim 10 wherein said deflecting means comprises
A. one or more pockets formed in each said aperture cover for receiving an end of said spring wire, each said pocket being spaced from said connecting means, and B. means on the cover plate for capturing a mid-portion of said spring wire, said capturing means being spaced from said connecting means.

12. The cover defined in claim 1 wherein said capturing means is positioned on the same side of said connecting means as said pockets and is located closer to said cover plate than said pockets, whereby the biasing means biases each aperture cover toward its closed position and biases at least some of said beads into said saddles.

13. The cover defined in claim 12 wherein there is a single aperture cover and said pockets are located at opposite ends of said cover and receive the opposite ends of said spring wire.

14. The cover defined in claim 12 wherein there are two aperture covers arranged side by side and said pockets are located at the remote ends of said two covers each receiving an end of said spring wire.

15. The cover defined in claim 12 wherein said cover plate and each said aperture cover are diecast metal parts with the beads and saddles being integral therewith.

16. The method of making a weatherproof outlet box cover comprising the steps of
A. forming a cover plate with an integral collinear saddle extending parallel to an edge of the cover plate and an integral boass on the inboard side of the saddle,
B. forming an aperture cover with an integral collinear bead extending along an edge of the aperture cover, said bead being arranged to rotatively seat in said saddle permitting the cover to swing from a closed position wherein it lies against the cover plate to an open position wherein it is angled away from the cover plate,
C. forming a pocket adjacent one end of the aperture cover,
D. forming a length of flexible resilient spring wire,
E. insertng one end of said spring wire into said pocket, and
F. capturing a segment of the spring wire remote from said end thereof at said boss so that said wire segment is deflected toward said cover plate whereby the wire functions as a cantilevered beam whose said end exerts a torque on the aperture cover tending to bias it toward its closed position.

17. The method defined in claim 16 wherein said wire segment is captured by engaging it under the boss.

18. The method defined in claim 16 wherein the wire segment is captured by upsetting a portion of the boss so that it overlies the wire segment.

19. The method defined in claim 16 including the additional steps of
A. forming a second aperture cover which is a mirror image of the first,
B. positioning the bead on said second aperture cover in said saddle so that the two aperture covers are arranged side by side and have a common bead axis, and
C. inserting the opposite end of the spring wire into the pocket formed in the second aperture cover whereby the single spring wire biases both aperture covers toward their closed positions.

* * * * *

UNITED STATES PATENT AND TRADEMARK OFFICE
CERTIFICATE OF CORRECTION

PATENT NO. : 4,134,516

DATED : January 16, 1979

INVENTOR(S) : Kenneth J. Sullo

It is certified that error appears in the above-identified patent and that said Letters Patent are hereby corrected as shown below:

Col. 4, line 42, "32" should be --35--.

Col. 4, line 44, "32" should be --35--.

Col. 12, line 4, "1" should be --11--.

Col. 12, line 27, "boass" should be --boss--.

As per the attached corrected drawing FIG. 1, "32" should be --35--.

Signed and Sealed this

Twenty-ninth Day of May 1979

[SEAL]

Attest:

RUTH C. MASON
Attesting Officer

DONALD W. BANNER
Commissioner of Patents and Trademarks